United States Patent [19]
Asselborn et al.

[11] 3,846,610
[45] Nov. 5, 1974

[54] MAKING OF LONGITUDINALLY WELDED METAL TUBES

[75] Inventors: Peter Asselborn; Werner Cramer, both of Bergisch Gladbach; Heinrich Müllejans, Erkrath-Unterbach, all of Germany

[73] Assignee: Felten & Guilleaume Carlswerk Aktiengesellschaft, Cologne, Germany

[22] Filed: Feb. 22, 1973

[21] Appl. No.: 334,953

[30] Foreign Application Priority Data
May 17, 1972  Germany.............................. 2208393
May 17, 1972  Germany.............................. 2223984
July 13, 1972  Germany.............................. 2234427

[52] U.S. Cl....................... 219/61, 72/176, 72/468
[51] Int. Cl............................................ B21c 37/08
[58] Field of Search................. 219/60 A, 60 R, 61; 72/176, 468

[56] References Cited
UNITED STATES PATENTS

| | | | |
|---|---|---|---|
| 3,023,300 | 2/1962 | Lehnert............................ | 219/60 R |
| 3,131,284 | 4/1964 | Gibson.................................. | 219/61 |
| 3,500,673 | 3/1970 | Wheeler et al. ................. | 72/176 X |

FOREIGN PATENTS OR APPLICATIONS

| | | | |
|---|---|---|---|
| 492,491 | 2/1930 | Germany............................. | 219/61 |

Primary Examiner—J. V. Truhe
Assistant Examiner—N. D. Herkamp
Attorney, Agent, or Firm—Michael S. Striker

[57] ABSTRACT

A method and an apparatus for making longitudinally welded tubes from metal strips are disclosed. The oppositely longitudinally extending marginal portions of a metallic strip are arcuately deformed in direction inwardly towards one another, and their free edges are thereupon subjected to a material-removing operation in preparation for subsequent welding. Thereafter the remainder of the strip intermediate the marginal portions is engaged and arcuately deformed so as to convert the strip into a tube whose edges face one another, and the edges are then welded together so as to form a finished metal tube.

12 Claims, 6 Drawing Figures

MAKING OF LONGITUDINALLY WELDED METAL TUBES

BACKGROUND OF THE INVENTION

The present invention relates generally to the making of metal tubes, and more particularly to the making of metal tubes from appropriately shaped metallic strips.

Still more particularly the invention relates to a method of making a metallic tube from shaped metal strips, and to an apparatus for carrying out the method.

The making of metallic tubes by appropriately shaping metallic strips and welding their free edges together is already known. Such operations are carried out continuously. That is, the metal strip advances in a predetermined direction and is continuously formed into the shape of a metal tube having a longitudinally extending slot defined by the juxtaposed free edges of the strip, whereupon these edges are welded together to form a longitudinally extending welded seam and make a complete tube. Tubes produced in this manner are subject to high requirements in terms of their metallic structure and the characteristics of the welded seam. It is frequently necessary to subject the end portions and/or the entire length of tube (the continuously produced tube is of course severed into lengths of desired size) to additional operations which are dictated by the use to which the tube is to be placed. Furthermore, if the welded seam is to be gas-tight, then it is not sufficient for the two surfaces of the metal strip to be free of deposited contaminants and inorganic and organic matter. Rather, and in particular, these requirements must all be met in terms of the exposed edges which are to be welded together, and the immediate vicinity of such exposed edges, that is the longitudinally extending marginal portions of the strip which are provided with these free edges. The edge must be completely free of any contaminants, especially of metal oxides, because at the high temperatures to which they are subjected during the welding operation, contaminants and metal oxides form gases, for instance as a result of decomposition, which cause the formation of voides and pores in the welded seam after the latter has become hardened. Voids and pores, however, are weak points in the metallic structure of the tube and represent potential dangers in terms of the weakening of the mechanical strength and of the gas-tightness of the tube, which dangers are particularly pronounced if the welded tube is subsequently to be corrugated or to be formed with flanges for connection with other components.

According to the prior art the strips which are to be formed into welded tubes of the type in question are first subjected to a cleaning operation before they are shaped to tubular configuration, and in order to obtain the desired tube diameter one or both of their marginal portions are trimmed with a revolving-shear cutter. Experience has shown, however, that the cutting surfaces so obtained will not sufficiently meet the requirements made for the subsequent welding operation. The surface which is created by the shear cut is rather coarse and formed with a burr. Moreover, the surface layers of the thus-formed edges have impressed into them during the shearing operation various contamintants, particularly metal oxides. If the thus-produced edges are welded, they will have the disadvantages outlined above.

A further disadvantage of this prior-art approach is that the sharp corners created on the edges tend to deeply engrave the forming dies through which the strip must pass after trimming with the shears, whereby not only damage to the forming dies will result but also material of the forming dies will be torn loose and carried along by the edges, which is especially disadvantageous if the forming dies are of polyethylene as is usually the case if the strip to be formed is aluminum. These synthetic plastic particles tend to produce significant quantities of gas when subjected to the heat of the subsequent welding operation, and will therefore cause particularly objectionable quantities and sizes of voids and pores in the welded seam.

According to the prior art it is often preferred to have the terminal one of the forming dies configurated as a closed drawing ring through which the arcuately bent strip must pass. The drawing ring has freedom of slight inclination about its horizontal axis which intersects the axis of the advancing almost-completed tube at right angles. This arrangement makes it possible to abut the strip edges if and when necessary, and to provide for a correction of the tube diameter. It has, however, certain disadvantages. In particular, with this arrangement there is a tendency for the tube to be deformed from circular to elliptical cross-section. If the drawing ring is inclined as mentioned before, then the horizontal dimension of the circular diameter of the tube will remain unchanged whereas the dimension in vertical direction will become decreased. Any diameter correction carried out on a tube by means of such a drawing ring, that is by tilting the drawing ring as pointed out above, will necessarily have as a result the deformation of the tube to an elliptical cross-section and will impart to the tube an outer diameter which is smaller than that which the tube would have had if the ring had not been inclined. This is disadvantageous and can in any case be carried out only within very narrow limits, unless one is willing to accept the other disadvantage that the tube must constantly pass through a permanently inclined drawing ring. Moreover, any further corrections by means of the already inclined drawing ring, that is any further attemps to correct the diameter of the tube being formed, will result in a still more pronounced elliptical cross-section of the tube. It is hardly necessary to point out that there are many instances where tubes of constant and precisely circular cross-section are absolutely essential, for flow-dynamic reasons and reasons of connections between tubes or components to be associated with the tubes, and also for electrical reasons in applications such as high-frequency coaxial cables. In the latter, as is known, two such tubes of different diameter are arranged coaxially one within the other and spacers are located in the annular gap defined between the two tubes and permit a precise distancing of the inner tube from the outer one. In this particular application the requirements for accuracy of the spacing between the tubes, and therefore for constancy of the tube diameter and exact circularity of the tube diameter, are measured in microns, and similarly stringent requirements are made in terms of the homogeneity of the tubes in the longitudinal direction thereof. This is particularly important in view of the fact that modern tube-forming apparatus permits the production of tubes, and therefore of coaxial cables, whose length is in effect limited only by considerations of transport. Evidently, if one of the two tubes, that is the inner or outer tube (constituting the inner or outer conductor, respectively) is not exactly circular over the entire length thereof, then a precisely defined spacing between the inner and outer tubes cannot be guaranteed, and the required electrical characteristics cannot be obtained for the cables.

The inclined drawing ring has a further disadvantage, namely that as the edges of the strip being formed to final tubular configuration leave the drawing ring, they tend to assume a wavy configuration. This, however, prevents the required constant distance between the electrodes which weld the edges together, and the edges themselves. In turn, any further inclination in the position of the drawing ring will aggravate this problem and require a correction of the distance between the electrodes and the strip edges, reducing the reliability of the welded seam being formed and causing of course a further deformation of the circularity of the tube cross-section. It is important to keep in mind here that the welding electrode is located behind or downstream of the last forming stage, that is the aforementioned drawing ring, and contacts the wedge-shaped strip edges which are being formed to the configuration of a tube. The difficulty with this arrangement is that the welding point is located downstream of the drawing ring, that is where the tube is no longer properly guided. Especially thick walled and also thin walled (hence elastic) tubes, such as tubes of special steels, are difficult to weld under these circumstances because the strip of which they have been formed tends to return towards flat condition after leaving the final drawing ring, which may result in a deformation of the welded seam and may cause the latter to shrink during cooling. Furthermore, with this arrangement, it is difficult if not impossible to properly surround the welding point completely with a protective gas so as to prevent access of air to it, which means that a weld free of oxidation cannot be assured. Also, a precise adjustment of the arc—usually, arc-welding is employed—so that it will contact the tip of the two strip edges which are inclined in a wedge shape relative to one another, is to all intents and purposes impossible, because the position of the welding point in space keeps changing during advancement of the tube, even though the change is only slight.

It is also known from the prior art to use as the final forming shape two opposite rollers which are each turnable about an axis normal to the advancement of the strip edges, and which are profiled in such a manner as to form between them the desired tube to be produced. These rollers can be adjusted so as to move them closer together or farther apart, whereby to permit the production of tubes of different diameters. This, however, has the disadvantage that the space defined between the profiles and in which the tube is being formed, will no longer be exactly circular, meaning that the finished tube will have an elliptical cross-section and the disadvantages outlined earlier, unless it is subjected to another forming step in which it is calibrated to the desired cross-sectional configuration.

It is clear from all this that the state of the art is in need of improvement.

SUMMARY OF THE INVENTION

It is, accordingly, a general object of the present invention to provide such improvements.

More particularly it is an object of the invention to provide an improved method of making metal tubes which avoids the disadvantages outlined above.

More particularly still, it is an object of the invention to provide such an improved method which assures the production of strip edges that are free of any contaminants at the time they are being welded together, thus permitting a gas-tight welded seam of great structural strength to be formed.

Another object of the invention is to provide an apparatus for carrying out the novel method.

In keeping with the above objects, and others which will become apparent hereafter, one feature of the invention resides in a method of making metal tubes which, briefly stated, comprises the steps of arcuately deforming the opposite longitudinally extending marginal portions of a metallic strip in direction inwardly towards one another, and subjecting the exposed edges of the marginal portion to a material-removing operation in preparation for subsequent welding. Thereupon the remainder of the strip intermediate the marginal portions is engaged and arcuately deformed, so as to convert the strip into a tube in which the edges face one another. This engagement and arcuate deformation is only of the remainder of the strip and no contact must be had with the exposed edges which have been subjected to the material-removing operation. Finally, the edges facing one another are then welded together to form a finished metal tube.

With the method according to the present invention and the apparatus for carrying it out, it is possible to produce longitudinally welded metal tubes of various different types of metallic material, for instance copper, aluminum or steel, and various different wall thicknesses, for instance as little as 0.5 mm and as great as 3 mm, or more or less. Moreover, the finished tube will always have a precisely circular cross-section and a subsequent calibrating step can thereby be avoided.

By subjecting the exposed edges to the aforementioned material-removing operation, and by not contacting them again until they are being welded together, the production of a satisfactory welded seam, without voids or pores, is assured and the problems of the prior art in this respect overcome.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
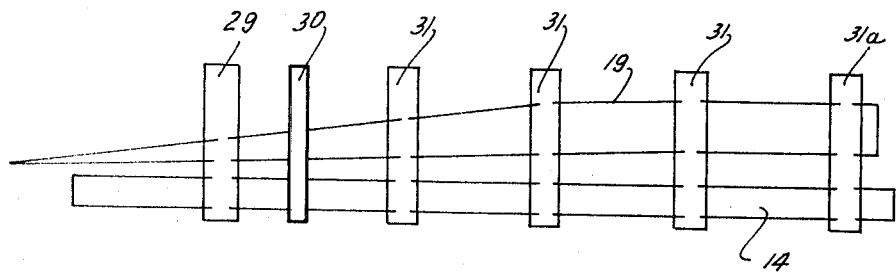
FIG. 1 is a diagrammatic side-elevational view of an apparatus according to the present invention.

Discussing now the drawing in detail, and the diagrammatic illustration in FIG. 1, it will be seen that reference numeral 19 diagrammatically illustrates a strip of metallic material which is first continuously passed through a plurality of cleaning devices which are not illustrated and which are entirely conventional. Furthermore, non-illustrated roller-type shears can be used to trim the width of the strip so that it will be slightly greater than required to form a tube of the desired diameter. The strip 19, which moves from left to right in FIG. 1, now enters the apparatus according to the present invention, passing firstly into and through a shaping die 29 where its marginal portions are arcuately shaped inwardly towards one another. Thereupon the partly formed strip 19 passes through a material-removing unit 30 where material is removed from the edges of the marginal portions, that is from the free edges of the strip 19, causing these free edges to be smoothed, cleaned and deburred, and resulting in simultaneous reduction of the width of the strip 19 to the final required width. Any and all contaminants which have been carried along on these edges out of the shaping die 29, for instance a portion of the die material, and all aluminum oxide (the strip 19 is assumed to be of aluminum in this instance) are removed, thereby removing a substantial obstacle to the formation of a good homogeneous welded seam. Any chips removed in the unit 30 can be withdrawn by suction, or they can be collected in a receptacle located below the unit 30. The partly formed strip 19 then passes through successive forming dies 31 in which its center portion intermediate the marginal portions is consecutively arcuately curved towards tubular configuration, but which do not contact the free edges 28 (to be discussed with reference to the other Figures) to avoid re-contamination thereof. Intermediate the dies 31 the strip may be protected against dust or the like, for instance by means of a transparent cover. All of the components thus far mentioned are mounted on a common supporting tube or rail 14 which in turn can be mounted on supports (not illustrated) on which it can be adjusted up and down.

Figure 2:
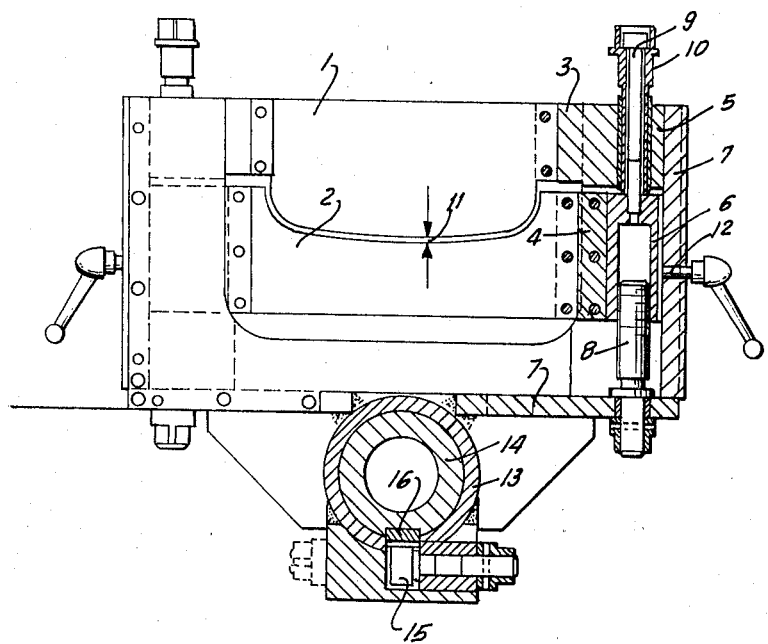
FIG. 2 is a partly sectioned front elevational view of a shaping die of the apparatus in FIG. 1.

Coming now to FIG. 2 it will be seen that the shaping die 29, the first component of the novel apparatus with which the strip 19 comes in contact, has two interengaging shaping portions 1, 2 which are removably held in appropriate mounts 3, 4, respectively. Holders 5 and 6 are guided in a receptacle 7 and are adjustable by means of a spindle 8, depending upon the height of the marginal portions of the edges 28. The receptacle 7 has a hub 13 by means of which it is mounted on the tube 14. A pinion 15 and a rack 16 cooperate to permit axial displacement of the receptacle 7 on the tube 14.

Adjusting screws 9 and 10 are provided by means of which a gap 11 can be set between the portions 1 and 2, the thickness of the gap 11 being selected in accordance with the thickness of the strip 19. A set screw 12 permits arresting of the elements 1–10 against movement.

The portions 1 and 2 as well as the members 3 and 4 are advantageously of steel if the strip to be processed is of copper, and they are advantageously of polyethylene if the strip 19 is an aluminum strip. In the latter case the elements 3 and 4 can be omitted. It will be seen that with this arrangement only the portions 1 and 2 need to be adjusted in order to permit the shaping of different materials into tubes of different diameters. In fact, as pointed out before, the elements 3 and 4 can be entirely omitted if the portions 1 and 2 are of polyethylene and the strip 19 of aluminum.

Figure 3:
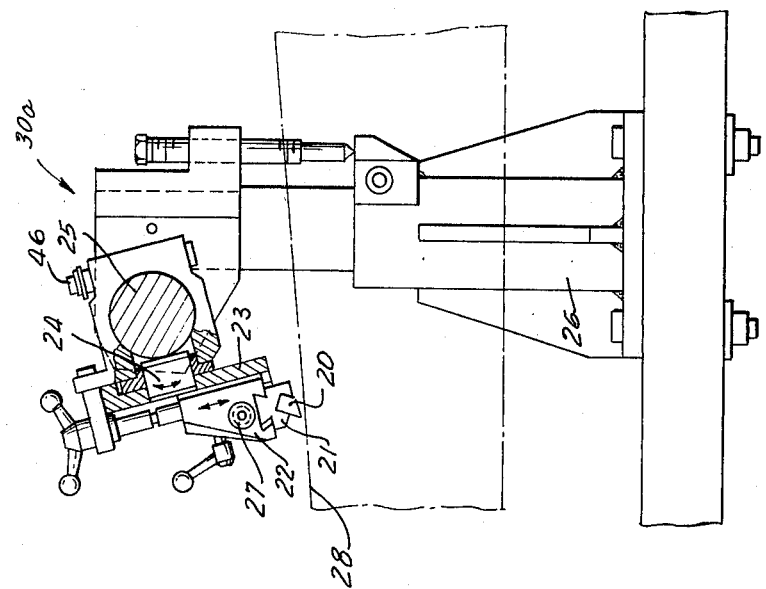
FIG. 3 is a partly sectioned side elevational view of the material-removing components of the apparatus in FIG. 1.

Downstream of the shaping die 29, as seen in the direction of advancement of the strip 19 (see FIG. 1) there is arranged the unit 30 which effects the removal of material from the free edges of the strip 19. This unit utilizes two material-removal devices 30, of which only one is illustrated in FIG. 3. It will be appreciated that each device 30 is associated with one of the free edges of the strip, which free edges are designated with reference numeral 28 and of which one is shown in phantom lines in FIG. 3. Each of the devices 30 has a cutting blade 20 which is arranged in a holder 21 engaged in a support 22; the blade 20 is horizontally displaceable with its holder 21 in the support 22, and the latter in turn is vertically displaceable on a plate 23, with the various displacements being carried out by means of threaded spindles. The components 20–23 can be turned about the pivot 24 and can be arrested in a selected position; they are also displaceable and arrestable on the rod 25 by means of the element 46. With this arrangement the position of the blade 20 can be accommodated to the particular position of the strip edge 28, and the blade 20 and holder 21 can constantly change their position transversely of the edge 28 by means of an automatically driven reversing spindle 27, so that they reciprocate transversely of the edge 28.

The blade 20 removes chips or shavings of material from the edge 28, imparting to the same the desired configuration and removing any contaminants. The edge 28 must now not again be touched in order to avoid re-contamination thereof which could disadvantageously influence the formation of the desired welded seam.

Figure 4:
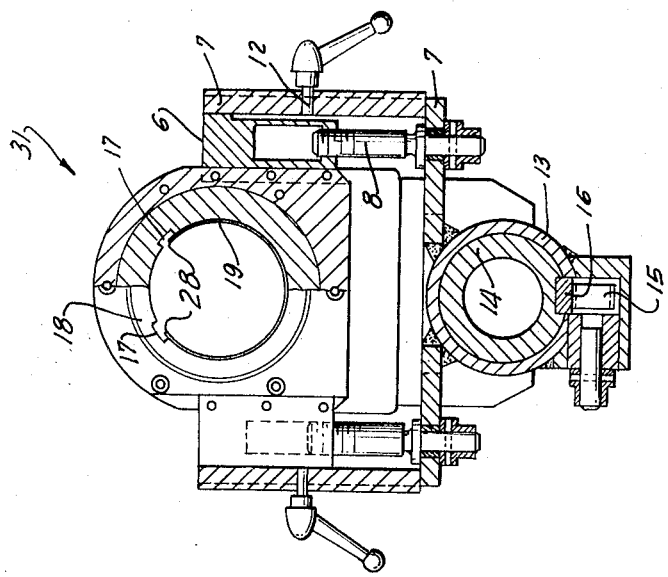
FIG. 4 is a partly sectioned elevational view illustrating one of the forming dies of the apparatus in FIG. 1.

Once the strip 19 has left the unit 30 with its two devices 30a, it passes successively through several of the forming dies 31 which are arranged spaced from one another as shown in FIG. 1. One such forming die 31 is illustrated in FIG. 4 and it will be seen that it has in the illustrated embodiment two recesses 17. Of course, it is possible to use a single forming die 31, but in most instances and most advantageously two or more of them will be used. The forming die 31 shown in FIG. 4 is a thick-walled disc 18 provided with a circular opening; the opening is successively smaller in each successive forming die 31, and each of the dies will be provided with the recesses 17. FIG. 4 shows clearly that the edges 28 of the strip 19 pass over these recesses 17 so that they remain out of contact with the material of the die 31 and are prevented from re-contamination. This is particularly important if the forming dies 31 should be made of polyethylene which is a popular material for such purposes because it can be readily shaped and creates little friction with respect to the strip 19. The material is, however, not particularly resistant to wear and the edges 28 would normally tend to wear away portions of the material and to carry them along as contaminants; this is avoided by provision of the recesses 17. Each of the dies 31 is mounted in a receptacle 7 analogous to the one which mounts the shaping die 29, and the element 7 can be displaced longitudinally on the tube 14 and arrested thereon by means of a set screw in the same manner as discussed with respect to the shaping die 29 in FIG. 2.

Figure 5:
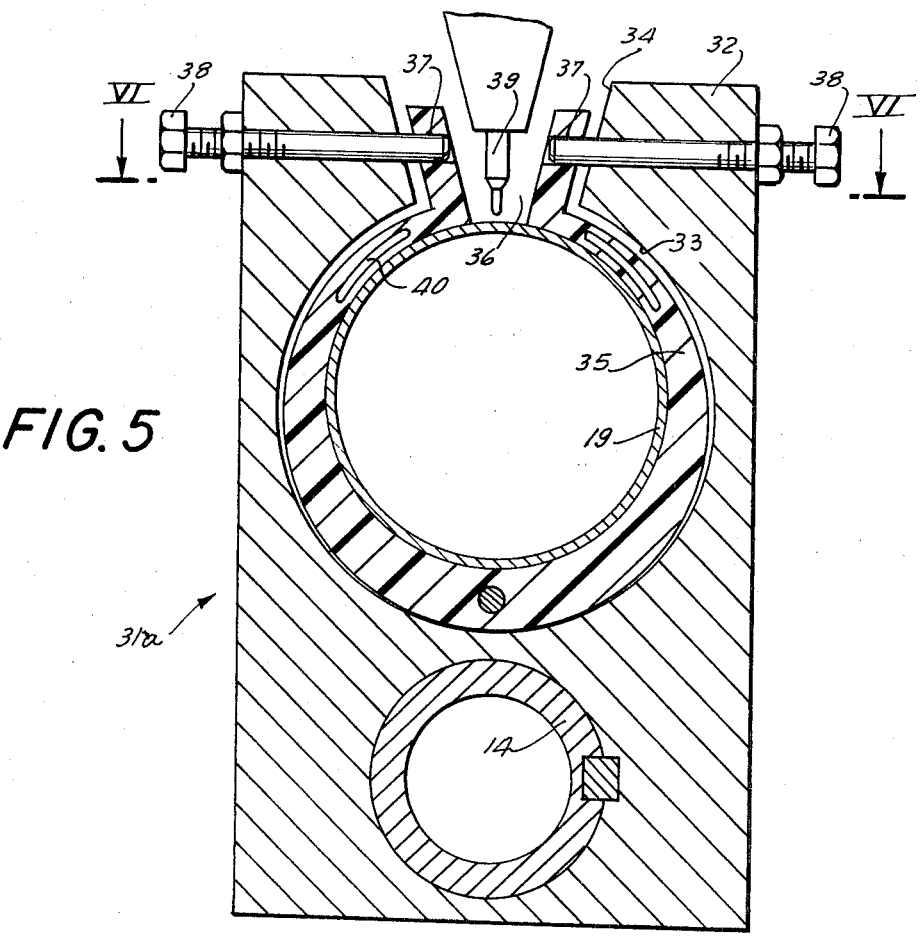
FIG. 5 is a cross-section, on an enlarged scale, through a terminal forming die of the apparatus according to FIG. 1.
Figure 6:
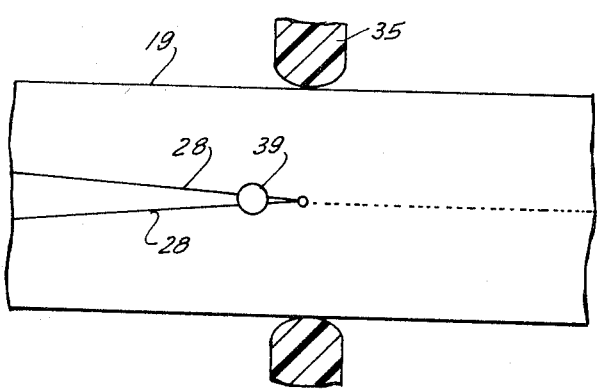
FIG. 6 is a section taken on line VI—VI of FIG. 5.

The terminal forming die 31a is shown in FIGS. 5 and 6 (see aso FIG. 1); it is different from the forming dies 31 of FIG. 4. It is in form of an annular element 35, for instance of synthetic plastic material, which is mounted in a holder 32 which may be of metallic material and has a circular opening 33. At its upper side the holder 32 is provided with a slot 34 which may be of V-shaped cross section, and the annular element 35 is located at the opening 33. The strip 19 which has been formed almost completely to tubular configuration is now bent in the annular element 35 to the final tubular shape, such that within the annular element 35 the edges 2 will come together in a wedge-shaped configuration as shown in FIG. 6. In the region of the edges 28 the annular element 35 is provided with a slot 36 and at its ends it has projections 37 which extend into the slot 34 and are engaged by set screws or spindles 38 which are journalled in the holder 32 and by means of which the width of the slot 36, and thereby the cross section of the opening of the annular member 35, can be adjusted. By turning the screws 38 in requisite direction the projections 37 may be moved closer towards or further away from one another, as will be evident. The thickness of the wall of the annular element 35 increases continuously in the direction circumferentially away from the slot 36, in correspondence with the configuration of a curved profile of the same strength, so that in each adjusting range of the annular element 35 the same will always have a circular-cross section opening through which the strip 19 passes.

A non-melting arc electrode 39 is arranged above the holder 32, being mounted in a manner that forms no part of the present invention, and having a tip which extends into the slot 36 in order to come as close as possible to the edges 28 to be welded. It serves to weld together these edges under the protection of a protective gas supplied in known manner. FIG. 6 shows that the electrode 39 is located rearwardly or upstream of the tip of the wedge-shaped gap defined by the edges 28 of the strip which are coming together in the direction of movement of the strip. This means that the edges 28 of the strip 19 are already molten by the time they come together at the tip of the aforementioned gap (see FIG. 6) and will become welded together on contact under the lateral pressure exerted by the element 35. Cooling channels 40 are provided within the annular element 35 in the region of the edges 28, to assure that the heat which predominantly occurs in this area can be rapidly removed by circulating cooling fluid (liquid or gas) through the channels 40. This prevents damage to the annular element 35 which, as pointed out before, may be of synthetic plastic material.

The holder 32 is also adjustably mounted on the tube 14, so that it can be moved closer to or further away from the last forming die 31 (see FIG. 1).

It will be appreciated that the apparatus according to the present invention has significant advantages over the prior art. One of these is the fact that the adjustable spindle permitting the movement of the cutter blade 20 makes it possible to clean the cutting edge of the blade during the operation, so as to assure that a proper cut—removal of material from the edge 28—is assured at all times. Due to the removal of chips or shavings from the edges 28, we obtain clean, smooth and burr-free edges with planar surfaces which can be readily and cleanly welded, instead of the contaminated rough burred edges that are produced according to the prior art. These edges cannot again be contaminated by contact with portions of subsequent components of the apparatus, due to the measures which have been outlined above.

Thus, a clean, structurally strong welded seam can be produced which is free of voids or pores and which permits the subsequent deformation of the welded tube into a corrugated tube or the formation of flanges on the tube without any disadvantageous consequences on the welded seam.

The tube produced according to the present invention will have a completely circular diameter, thereby avoiding the necessity for a subsequent calibrating step. The fact that the annular element 35 can be made of a springy elastically deformable material, such as synthetic plastic material or for instance steel, and the aforementioned variation in its wall thickness, assure that within a certain range the annular element 35 can be readily adjusted merely by means of the screws 38 to produce tubes of different but strictly circular diameter without any other adjusting measures needing to be taken. Clearly, the mere adjustments of the annular element 35 which are discussed with respect to FIGS. 5 and 6 above, permit such variations in the tube diameter while maintaining complete circularity.

The fact that the welding-together of the edges 28 occurs at their point of contact (at the tip of the wedge-shaped formation defined by the two edges 28, see FIG. 6) assures that the strip cannot tend to move apart due to its inherent elasticity because sufficient transverse pressure will still act upon the welded tube downstream of the annular element 35 in the immediate vicinity of the latter, to prevent such moving-apart of the strip and thereby of the welded edges 28. Also, with the electrode being arranged as shown in FIG. 5 and 6, protective gas can readily pass through the open gap defined between the edges 37 and can completely protect the weld against access of air while the welding arc uniformly softens and melts the two edges 28 which are not yet in contact with one another, so that they will move into contact in softened condition and will become welded together and rigid immediately after such contact.

The electrode tip may also be located between the two edges 37, that is in the V-shaped gap defined between them, an arrangement which is particularly advantageous if metal strip 19 of relatively substantial wall thickness is to be welded, because this arrangement assures that a proper welding of the edges 28 will be obtained over the entire wall thickness of the strip 19.

It will be understood that each of the elements described above, or two or more together, may also find a useful application in other types of constructions differing from the type described above.

While the invention has been illustrated and described as embodied in the production of welded tubes from metallic strips, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letter Patent is set forth in the appended claims.

1. A method of making metal tubes, comprising the steps of arcuately deforming the opposite longitudinally extending marginal portions of a metallic strip in direction inwardly towards one another; subjecting the exposed edges of said marginal portions to a material-removing operation in preparation for subsequent welding; engaging and arcuately deforming only the remainder of said strip intermediate said marginal portions to prevent contact with and contamination of said edges, so as to convert the strip into a tube in which said edges face one another; and welding said edges together so as to form a finished metal tube.

2. A method as claimed in claim 1, wherein the step of subjecting said edges to a material-removing operation comprises machining said edges.

3. A method as defined in claim 1, wherein the step of subjecting said edges to a material-removing operation comprises shaping said edges with a chip-removing cutting tool.

4. In an apparatus for making metal tubes, a combination comprising first means for arcuately deforming the opposite longitudinally extending marginal portions of a metallic strip in direction inwardly towards one another; second means for subjecting the exposed edges of said marginal portions to a material-removing operation in preparation for subsequent welding; third means for engaging and arcuately deforming only the remainder of said strip intermediate said marginal portions to prevent contact with and contamination of said edges, so as to convert the strip into a tube in which said edges face one another; and fourth means for welding said edges together so as to form a finished metal tube.

5. A combination as defined in claim 4, wherein said first means comprises at least one shaping die including two discrete interengaging shaping portions, and adjusting means for adjusting the portions of said shaping die relative to one another.

6. A combination as defined in claim 4, wherein said second means comprises a cutting blade for engagement with a respective one of said edges, mounting means mounting said cutting blade for arrestable turning movement to a plurality of angular positions relative to said edges, and drive means for effecting reciprocatory movement of said cutting blade transversely of the respective edge.

7. A combination as defined in claim 4, wherein said third means comprises a plurality of forming dies each configured for engaging and forming only the remainder of said strip which is located intermediate said marginal portions.

8. A combination as defined in claim 7, wherein said strip advances in a predetermined direction, said forming dies being spaced from one another in said direction and including a terminal forming die; and wherein said terminal forming die is an annular element having an inner circular passage and having a gap in its circumference in which said edges of said strip are exposed for welding.

9. A combination as defined in claim 8, wherein said terminal forming die further comprises means for varying the transverse dimension of said gap so as to vary the diameter of a tube being formed.

10. A combination as defined in claim 9, wherein said annular element is of resiliently deformable material and has a wall thickness which increases circumferentially in direction away from said gap.

11. A combination as defined in claim 8, wherein said fourth means comprises a non-melting welding electrode having a tip which extends into said gap and is located proximal to said edges.

12. A combination as defined in claim 11, wherein said edges are laterally spaced from one another; and wherein said tip extends between said edges.

* * * * *